United States Patent
Ott et al.

(10) Patent No.: US 12,343,827 B2
(45) Date of Patent: Jul. 1, 2025

(54) WIRE FEEDER WITH ADJUSTABLE LIFT

(71) Applicant: Illinois Tool Works Inc., Glenview, IL (US)

(72) Inventors: Brian Lee Ott, Sherwood, WI (US); Adam Richard Schmitz, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 411 days.

(21) Appl. No.: 17/683,759

(22) Filed: Mar. 1, 2022

(65) Prior Publication Data

US 2022/0288715 A1    Sep. 15, 2022

Related U.S. Application Data

(60) Provisional application No. 63/158,598, filed on Mar. 9, 2021.

(51) Int. Cl.
*B23K 9/133* (2006.01)

(52) U.S. Cl.
CPC .................................. *B23K 9/1336* (2013.01)

(58) Field of Classification Search
CPC ....... B23K 9/133; B23K 9/1336; B23K 9/173
USPC ....................................................... 219/137.2
See application file for complete search history.

(56) References Cited

U.S. PATENT DOCUMENTS

| | | | |
|---|---|---|---|
| 10,034,527 B2 * | 7/2018 | Korey ..................... | A45C 5/06 |
| 2004/0026393 A1 | 2/2004 | Matiash | |
| 2008/0156783 A1 | 7/2008 | Vanden Heuvel | |
| 2018/0318955 A1 * | 11/2018 | Dessart .................. | B23K 37/02 |
| 2021/0298441 A1 * | 9/2021 | Song Kündig .......... | A45C 5/14 |

OTHER PUBLICATIONS

European Office Communication with extended Search Report Appln No. 22160344.2 dated Sep. 6, 2022.

* cited by examiner

*Primary Examiner* — Chris Q Liu
*Assistant Examiner* — James F Sims, III
(74) *Attorney, Agent, or Firm* — McAndrews, Held & Malloy, Ltd.

(57) ABSTRACT

A welding system has a wire feeder having an adjustable lift point. The wire feeder includes a wire supply source configured to supply welding wire, a wire drive assembly configured to feed wire to a welding gun from the spool, and a support base. The wire supply source and the wire drive assembly are supported by the base. A lift member is connected to the support base and is selectively movable in at least one direction with respect to the support base to enable adjustment of the lift point of the wire feeder.

19 Claims, 4 Drawing Sheets ically to the support base. A lift member is movable with respect to the support base to enable adjustment of the lift point when the

WIRE FEEDER WITH ADJUSTABLE LIFT

RELATED APPLICATIONS

The present application claims the benefit of U.S. Provisional Patent Application Ser. No. 63/158,598, filed Mar. 9, 2021, entitled "WIRE FEEDER WITH ADJUSTABLE LIFT." The entirety of U.S. Patent Application Ser. No. 63/158,598 is expressly incorporated herein by reference.

FIELD OF THE DISCLOSURE

The present disclosure relates generally to welding systems and, more particularly, to a wire feeder with an adjustable lift point.

BACKGROUND

MIG welding, formerly known as Gas Metal Arc Welding (GMAW), combines the techniques and advantages of TIG welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control.

A wire feeder is operationally connected to the power source and is designed to deliver consumable wire to a weld. Often times, it is desirable that a MIG welding system, including the wire feeder, be portable to support various welding operations outside of a shop or plant setting. The system may undergo movement from multiple locations in any given day. Wire feeder systems may have great mass and have a large footprint, taking up a significant amount of space. To facilitate moving the system, wire feeders are often supplied with a lift point so they can be moved by lifting equipment, such as a crane, gantry, or lift. Prior lift points for wire feeder systems are fixed with respect to the wire feeder assembly and spool reel. Wire feeder systems with fixed lift points are often unbalanced and have orientations that change as the system is lifted.

SUMMARY

Disclosed example welding systems include a wire feeder having an adjustable lift point, and include a wire supply source configured to supply welding wire, a wire drive assembly configured to feed wire to a welding gun from the wire supply source, and a support base. The wire supply source and the wire drive assembly are supported by the base, and a lift member is connected to the support base and is selectively movable in at least one direction with respect to the support base to enable adjustment of the lift point of the wire feeder.

In some examples, the lift member is selectively moveable in at least two directions with respect to the support base. In some examples, the lift member is configured to be selectively rotated about an axis to adjust the lift point. The wire feeder may include a latch assembly actuatable to selectively lock the lift member in positions with respect to the support base. In some examples, the wire feeder includes a latch assembly with a lever arm that is pivotable about a lever axis between a latched position and an unlatched position. A lift member is movable with respect to the support base to enable adjustment of the lift point when the lever is in the unlatched position, and the lift member is locked with respect to the support base when the lever is in the latched position.

In some examples, the latch assembly has a biasing member to bias the lever to the locked position. In some examples, the wire feeder includes a fastener, and a plate including a plurality of openings. The fastener is removably insertable into the openings to selectively lock the lift member in a plurality of positions with respect to the base.

In some examples, the wire drive assembly is positioned in front of the wire supply source on the support base. In some such examples, a longitudinal direction is defined between the wire drive assembly and the wire supply source, and the lift member is selectively movable in a direction transverse to the longitudinal direction to enable horizontal adjustment of the lift point of the wire feeder.

In some examples, the lift member is selectively moveable to a plurality of positions with respect to the support base, including a lift position in which the lift member is located above at least one of the wire drive assembly and the wire supply source with respect to the vertical direction, and a tow position in which the lift member is located at a forward end of the support base or a rear end of the support base to enable towing of the wire feeder with the lift member.

In some examples, the support base comprises a plate defining a support surface, the wire drive assembly and the wire supply source are positioned on the support surface, and the lift member is located at a front portion of the plate forward of the wire drive assembly when the lift member is in the tow position.

In some examples, the lift member is a lift eye.

In some examples, a wire feeder has an adjustable lift point and comprises a hub configured to support a spool of welding wire, a wire drive assembly including a housing and configured to feed wire to a welding gun from the spool, and a base. In some such examples, the hub and the wire drive assembly are supported by the base. The system further includes a lift eye connected to the base and selectively movable to a plurality of positions with respect to the base to adjust a lift point and the center of gravity of the wire feeder.

In some examples, the wire drive assembly is positioned in front of the hub, the plurality of positions includes at least two positions, with a first of the two positions closer to the front of the wire drive assembly than a second of the two positions. In some examples, the plurality of positions includes a tow position in which the lift is located forward of the wire drive assembly to enable the wire feeder to be pulled along a horizontal plane. In some examples, the plurality of positions includes at least two positions including a first position that is further forward than a second position.

The wire feeder may also have a plurality of horizontal positions offset from the horizontal center of the wire drive assembly. In some examples, the wire feeder includes a frame member extending from the base, the lift eye is connected to the frame member, and the frame member is selectively rotatable about an axis to adjust the position of the lift eye with respect to the base.

In some examples with a frame member extending from the base, the frame member is selectively movable to adjust the position of the lift eye with respect to the base, and a fastener is configured to selectively lock the frame member in place.

BRIEF DESCRIPTION OF THE DRAWINGS

The figures are not necessarily to scale. Wherever appropriate, similar or identical reference numerals are used to refer to similar or identical components.

DETAILED DESCRIPTION

Figure 1:
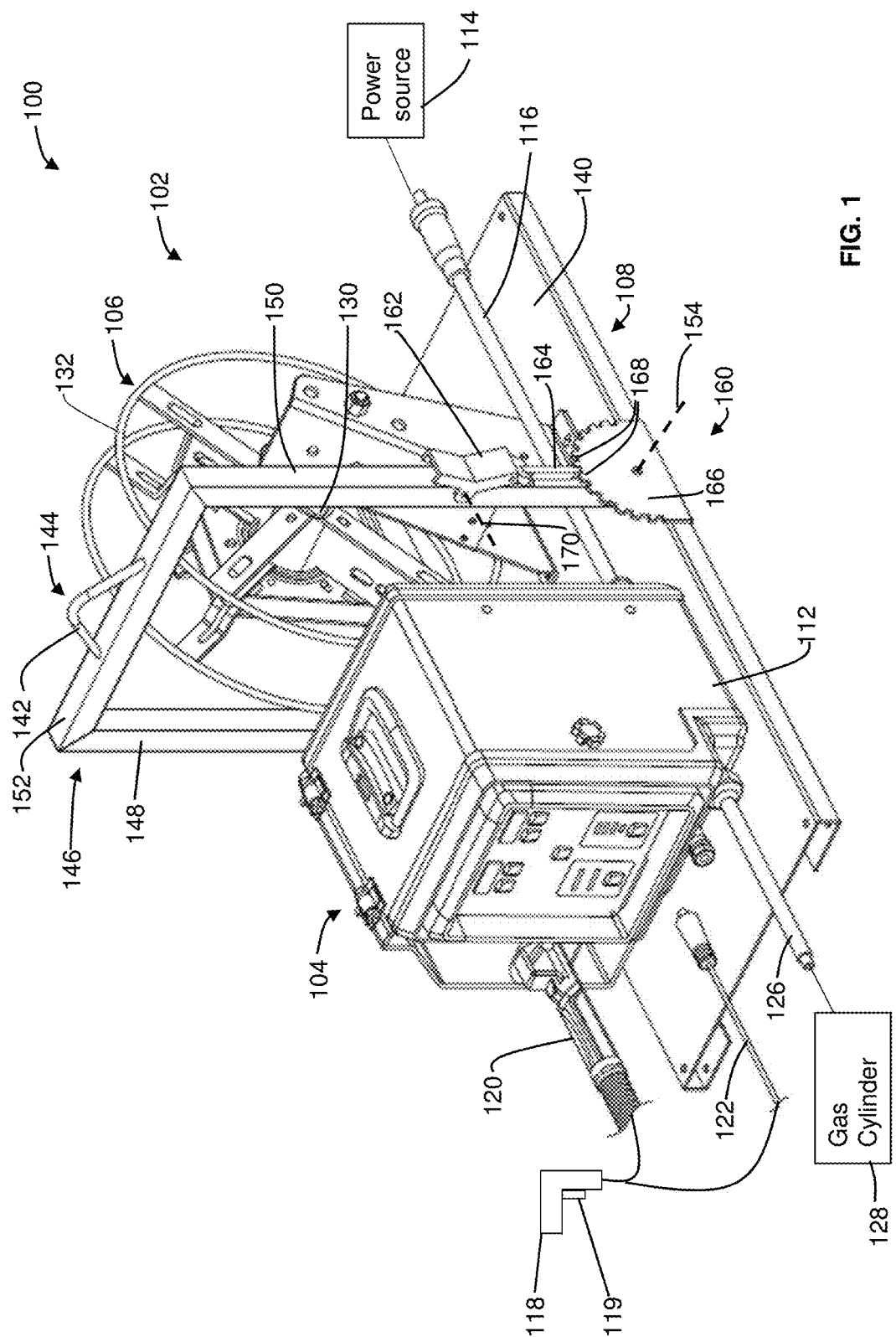
FIG. 1 is an isometric view of an example a wire feeder having an adjustable lift point, in accordance with aspects of this disclosure.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the term "embodiments" does not require that all disclosed embodiments include the discussed feature, advantage, or mode of operation.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The present disclosure will be described with respect to a welding system with an adjustable lift point including a wire feeder of a MIG welding system. However, the present disclosure is applicable to power sources and various welding systems, for example, power sources for TIG, stick, flux cored, and the like welding systems. Moreover, the present disclosure is also applicable to supports for non-welding, high power systems such as plasma cutters and induction heaters, and other mechanical systems and components (including non-welding related systems) that may be positioned on a support structure with a moveable lift point.

Figure 2:
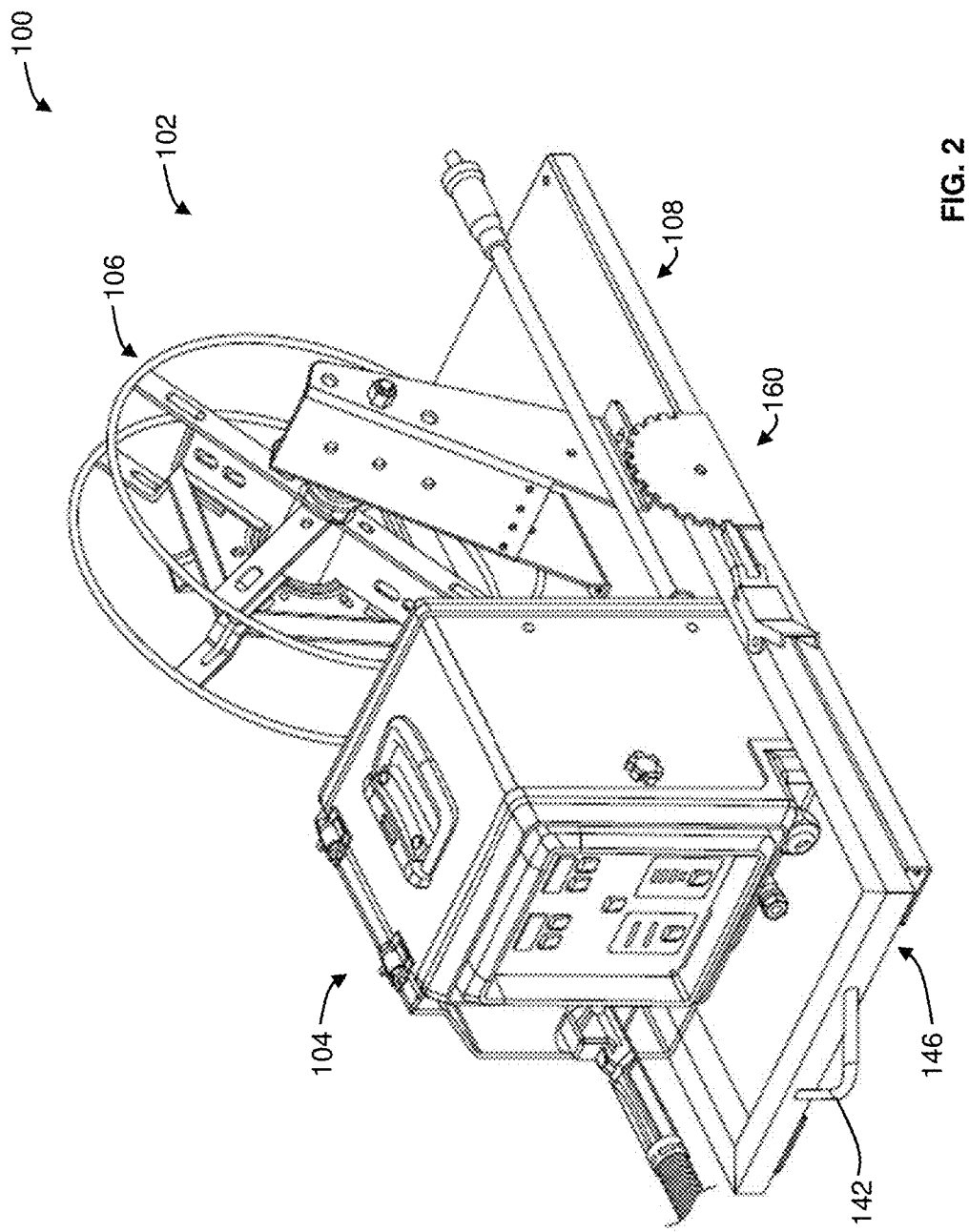
FIG. 2 is an isometric view of the welding system of FIG. 1 with the lift point in a tow position.

Referring to FIGS. 1 and 2, a welding system 100 includes a wire feeder 102 with a drive assembly 104 and a wire supply source 106, and a support base 108. The drive assembly 104 of the wire feeder 102 includes rollers or gears (not shown) to advance consumable welding wire from the wire supply source 106 to a welding torch or gun. In the embodiment shown, the drive assembly 104 is protected by a housing 112. In other embodiments, additional components of the wire feeder may be positioned in a housing such as housing 112. For example, the wire supply source may be positioned in a housing with the drive assembly (e.g., a briefcase wire feeder).

Power is supplied to the wire feeder 102 by a welding power source 114 through a weld cable 116. The power source is designed to run in various modes, such as voltage-controlled, or current-controlled, and is further configured to power other welding systems and to provide auxiliary power to various accessories. Power source 114 is designed to condition raw power supplied from a utility line or engine driven power supply and output power usable by the welding process. The output of the power source 114 is generally controlled by a controller and associated operational circuitry that regulates the secondary or output side of the power conditioning components. A gas supply line 126 connects the wire feeder 102 to a gas source or cylinder 128 to provide shield gas for welding operations.

A welding gun or torch 118 connects to the wire feeder 102 via a wire guide line 120. The gun 118 is configured to supply consumable welding wire to a workpiece. Control signals are transmitted between the torch 118 and the wire feeder 102 via a control line 122. Torch 118 is equipped with a trigger 119 that, when depressed, causes a transceiver of a controller (not shown) in the housing 112 of the wire feeder 102 to transmit control signals to the power source 114 through weld cable 116.

The wire supply source 106 in the example of FIG. 1 includes a reel or a hub 130 that rotatably supports a spool 132 of welding wire (welding wire not shown). Wire is drawn from the spool 132 by the drive assembly 104. The spool 132 rotates to allow additional wire to be unwound from the spool as the wire is drawn through the drive assembly 104. While a spool of wire is depicted, other sources of wire may be utilized by wire feeder 102, for example, a free spool, a container or box with spooled wire, or any other desirable source of welding wire usable by a drive assembly.

The drive assembly 104 and wire supply source 106 are supported by a support base 108. The support base 108 rigidly connects the drive assembly and the wire supply source together to ensure proper orientation to perform a welding operation, and to allow the feeder to be transported. In the embodiment depicted, the drive assembly 104 and the wire supply source 106 are supported on a support plate 140 of the support base 108. The drive assembly and wire supply in the embodiment shown are mounted to the plate, for example, bolted to the plate, welded to the plate, or the like.

The welding system 100 further includes a lift member 142 connected to the support base 108 which facilitates the lifting and transportation of the wire feeder 102. In the embodiment shown, the lift member 142 is a lift eye that is sized to receive the hook or other attachment structure of a crane, gantry, or other suitable lifting device (not shown). The hook or other attachment structure is connected to the lift member 142 and the lifting device is operated to lift and maneuver the welding system 100 from one location to another. For example, the system may be lifted from the bed of a truck and placed in a desirable location at a work site. While a lift eye is depicted in the embodiment of welding system 100, in other embodiments, any lift member with an opening or handle suitable to be grasped by an operator or lifting device may be utilized.

The lift member 142 includes a lift point 144, which is the point in dimensional space at which the welding system is lifted by, e.g., a lifting device. The location of the lift point 144 of welding system 100 is adjustable with respect to the support base 108, the drive assembly 104, and the wire supply source 106. In embodiments, the lift point of the welding system may be moved in one, two, or three dimensions to ensure the welding system is properly balanced when lifted. As a general matter, welding systems such as welding system 100 are typically oriented in a horizontal plane during operation, for example, while in the bed of a truck, on a stand, or the like, at a work site. When the system is lifted to transport or maneuver the system, the welding system is lifted at the lift point. If the lift point coincides with the center of gravity of the welding system, then the welding system is balanced and generally maintains the horizontal orientation when the system is lifted at the lift point. If not, the weld system may be unbalanced and tend to rotate or otherwise move to a different orientation. By adjusting the lift point, a desired balance and orientation may be achieved. Of course, while reference is made to the generally horizontal orientation, the lift point may be adjusted to achieve any desired orientation of the system when it is lifted, including any desired angle(s).

By providing an adjustable lift point, the desired balance or orientation may be achieved for multiple product configurations. For example, different models of wire feeders, drive mechanisms, wire sources, may have various configuration, physical footprint, weights, weight distributions, center of gravity, and so forth, depending on the particular welding system and components thereof. With an adjustable lift point, a desired balance or orientation may be achieved regardless of the specific type of configuration of components, including the specific center of gravity of such components and their position on a support structure to be lifted.

The adjustable lift point also accommodates shifts in the center of gravity of the system that may occur in day-to-day operation of a welding system. As an example, the center of gravity may change when a new wire spool is installed, as the wire supply source is depleted during operation, when sizeable cables are connected to the wire feeder, when equipment such as welding torches are placed on the wire feeder housing or support structure, and so forth. In these and other scenarios, the center of gravity may shift forward and aft (longitudinally), and/or to either side (laterally). Regardless of the reason for the resultant center of gravity, desired balance and orientation may be achieved by adjusting the lift point forward or aft (rearward or longitudinally), and/or to either side laterally (e.g., to coincide with the center of gravity). In another example, it may be desired to tow the welding system, or pull the system across a surface, such as in a generally horizontal direction. The lift point may be adjusted so that it is forward of, to the side, or to the rear of the wire feeder to facilitate such movement. An example of a tow position for welding system 100 is depicted in FIG. 2, where the lift point is forward of the drive assembly whereby the wire feeder may be pulled or towed across a surface. However, the welding system 100 may be configured to be towed from the reverse (e.g., backward) direction by configuring the lift point to the rear of the wire supply source 106. The example support base 108 may include, or be configured to attach, equipment (e.g., skids and/or wheels) to reduce the effort involved in towing the welding system 100 and/or reduce wear on the support base 108 due to towing.

In the example wire feeder 102, the lift member 142 is connected to the support plate 140 by a frame 146. The frame includes vertical frame members 148, 150 (e.g., beams) and a cross frame member 152 (e.g., crossbeam). The lift member 142 is secured to the frame member 152. The frame 146 is pivotable or rotatable with respect to the support frame about an axis 154. The frame 146 defines an opening between the frame members 148, 150, 152, enabling the frame 146 to pivot at least 180 degrees from a full vertical position depicted in FIG. 1, and a horizontal or tow position (one horizontal position depicted in FIG. 2), without obstruction by drive assembly 104, wire supply source 106, or other components of the welding system. By rotating the frame 146 with the lift member 142, the lift point 144 and the center of gravity of the welding system may be adjusted. The lift point 144 of welding system 100 is adjustable forward and aft (longitudinally), as well as adjustable in the vertical direction.

Welding system 100 further includes a latch assembly 160 to lock the lift point 144 in one of plural, preselected positions. Latch assembly 160 includes a lever 162 with an arm 164, and a cog 166 with teeth 168. The example lift member 150 may be rotatably coupled to the cog 166 at the axis 154 (e.g., via a bolt and locknut, a threaded stud, etc.), or may be rotatably coupled to the base 108 such that the lift member 150 rotates with respect to the axis 154. The frame member 148 may be similarly coupled to a corresponding cog or plate, or to the support frame 108, with the same rotational axis 154.

Lever 162 is pivotable about axis 170 to move the latch assembly 160 between locked and unlocked positions. A biasing member, such as a torsion spring (not shown), biases lever 162 towards a locked position in which arm 164 of lever 162 cooperates within an opening between two adjacent teeth 168 of the cog 166. Latch assembly 160 may be actuated to an unlocked position by pivoting lever 162, causing arm 164 to move out of engagement with the cog 166. While unlocked, frame 146 may be rotated to a preselected position to adjust the lift point. The lever 162 may then be released. When released, lever 162 is biased to a locked position in which the arm 164 cooperates within an opening between adjacent teeth 168. Each opening between a pair of adjacent teeth 168 represents a different preselected position for the lift point. Adjustment allows for the welding system to be balanced for a lifting operation, and enables the lift point to be moved to positions that facilitate lifting, for example, as shown in FIG. 1, and to positions that facilitate towing, for example, as shown in FIG. 2.

Figure 3:
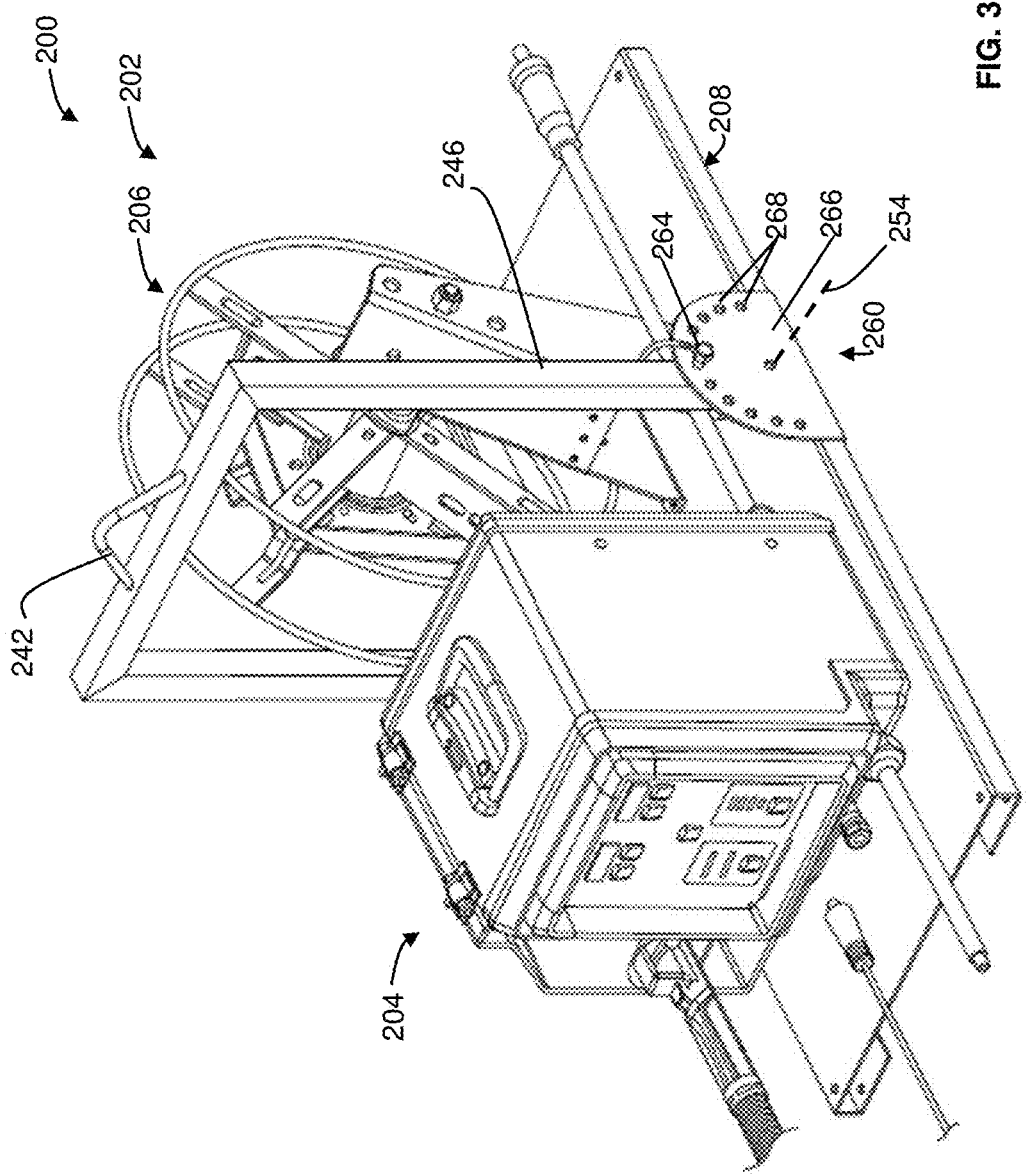
FIG. 3 is an isometric view of another example a wire feeder having an adjustable lift point, in accordance with aspects of this disclosure.

Turning to FIG. 3, an example welding system 200 includes a wire feeder 202 with a drive assembly 204 and a wire supply source 206, and a support base 208. A support frame 246 is pivotably mounted to the support base 208, and supports a lift member 242. The welding system 200 includes a latch assembly 260 having a plate 266 with openings 268, and a fastener 264. The example plate 266 is rotatably connected to the support frame 246 at an axis 254 (e.g., via a bolt and locknut, a threaded stud, etc.), or may be rotatably coupled to the base 208 such that the support frame 246 rotates with respect to the axis 254. A similar plate may be rotatably connected to the support frame 246 and the support base 208 on an opposite side from the plate 266, such that both sides of the support frame 246 have the same rotational axis 254.

In the embodiment shown, the fastener 264 is a removable pin with a retaining detent (not shown) and/or locking pin. However, any suitable fastener may be used to implement the fastener, such as a bolt and locknut combination. The support frame 246 also includes an opening (not shown). The support frame 246 is pivotable to a plurality of positions in which the opening of the support frame 246 aligns with a selected opening 268 of the plate 266. When the openings are aligned, the fastener 264 is inserted to lock the support frame 246 in place. By selecting a desired position, the lift point of the welding system 200 and the center of gravity may be adjusted.

Figure 4:
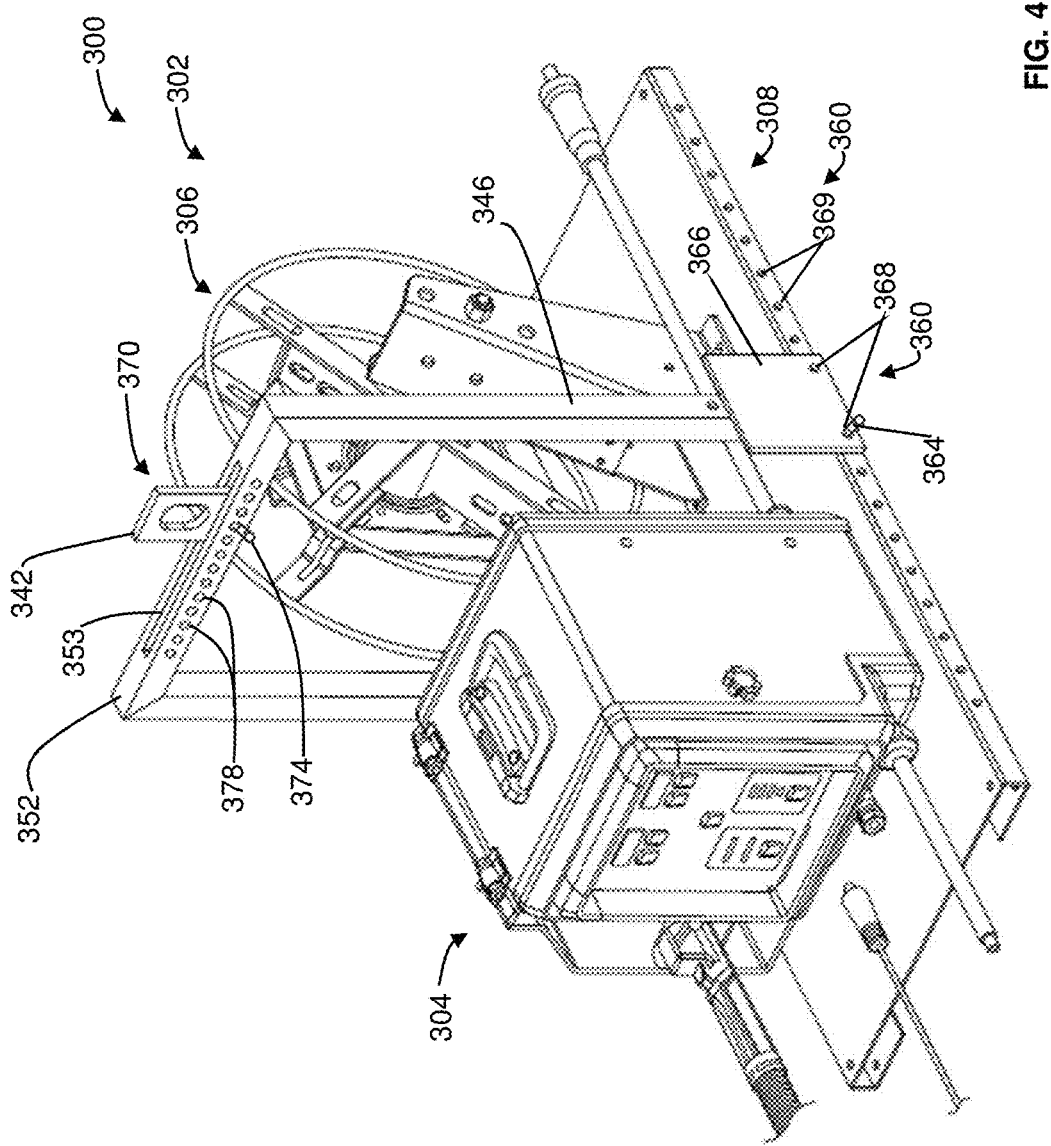
FIG. 4 is an isometric view of another example wire feeder having an adjustable lift point, in accordance with aspects of this disclosure.

FIG. 4 depicts another example welding system 300 including a wire feeder 302 with a drive assembly 304 and a wire supply source 306, and a support base 308. A support frame 346 supports a lift member 342 with a lift point, and is removably mounted to the support base 308. The support frame 346 further includes a frame member 352 (e.g., beam) with a channel 353. The horizontal position of the lift member is adjustable within the channel 353 of the beam 352. The welding system 300 includes a latch assembly 360 and a latch assembly 370. Latch assembly 360 includes a plate 366 with openings 368, and a fastener 364. The latch assembly 360 includes a plurality of openings 369 on either side of the support base 308. With the fastener 364 removed, the support frame 346 is movable along the length of the support base 308 to adjust the lift point in the front/rear direction. The example support frame 346 is attached to the plate 366 (e.g., via welding, via one or more fasteners, etc.), and may be attached to a similar plate on an opposite side of the support base 308. The support frame 346 is locked in position by aligning an opening 368 of the plate 366 with an opening 369 of the support base 308, and inserting the fastener 364 through the aligned openings.

Latch assembly 370 includes a plurality of openings 378 in the frame member 352, a corresponding opening (not shown) in the lift member 342, and a fastener 374. The lift member 342 is adjustable in the horizontal direction when the fastener 374 is removed. The lift member 342 may be locked in place horizontally by aligning the opening (not shown) of the lift member 342 with a corresponding opening 378, and inserting the fastener 374 through the aligned openings. In the described manner, the latching mechanisms 360, 370 enable adjustment of the lift member in the forward/rearward (longitudinal) and horizontal (lateral) directions to adjust the lift point and the center of gravity of the welding system 300. In other embodiments, vertical adjustment is also implemented. For example, in embodiments, a plurality of openings are located in a first vertical frame member of the support frame, such as support frame 346, which may be aligned with corresponding openings with another vertical frame member, and locked in place with a bolt or pin. Any desired configuration to provide adjustment of the location of the lift point and/or center of gravity in one dimension, two dimensions, or three dimensions (x, y, z plane, and including rotational positions) may be implemented. As used herein, adjustment of the lift point with respect to the support base according to any of the foregoing examples may also be considered as an corresponding adjustment in the moment of the lifted welding system (e.g., the equipment attached to the support base and lifted via the lift point) with respect to the lift point.

As stated above, the present disclosure is also applicable with non-MIG welding systems such as TIG and stick welders. Any desired welding system, power supplies, welding components, or other mechanical systems and components (including non-welding related systems) may be positioned on a support structure with a moveable lift point, such as a support base. For example, an all-in-one welding system having an integrated power supply, wire feeder, and wire supply may be positioned on a support base including the example moveable lift points disclosed herein. Additionally or alternatively, the support base allows for a flexible configuration of attached equipment while also enabling the lift point to be moved with respect to the support base to better balance the selected arrangement of equipment when lifted and/or towed.

While example support frames 146, 246, 346 for lift points 142, 242, 342 are disclosed and depicted, other structures or shapes may be used to implement the support frames. For example, instead of multiple pieces (e.g., frame members, beams, etc.) being assembled to create the support frame, one or more pieces may be curved, bent, molded, cast, and/or otherwise fabricated to reduce the number of joints present in the support frame. For example, the support frame may be fabricated as a single, generally U-shaped member, to which the lift point can be affixed and/or adjusted.

In some examples, instead of physically moving a lift member 142, 242, 342 and securing the lift member to different points on the support frames 146, 246, 346, in other examples multiple lift members are integral to the support frames 146, 246, 346, allowing for direct attachment of the lifting equipment to different integral lift members to change the lift point with respect to the center of gravity of the welding system.

The present disclosure has been described in terms of preferred embodiments, and it is recognized that equivalents, alternatives, and modifications, aside from those expressly stated, are possible and within the scope of the appending claims. The foregoing description and accompanying figures illustrate the principles, preferred embodiments, and modes of operation. However, the disclosure should not be construed as being limited to the particular embodiments discussed above. Additional variations of the embodiments discussed above will be appreciated by those skilled in the art.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A wire feeder having an adjustable lift point, comprising:
    a wire supply source configured to supply welding wire;
    a wire drive assembly configured to feed wire to a welding gun from the wire supply source;
    a support base, the wire supply source and the wire drive assembly supported by the base; and
    a lift member connected to the support base, the lift member comprising a lift eye and selectively movable in at least one direction with respect to the support base to adjust a position of the lift eye with respect to the base to thereby adjust the lift point of the wire feeder.

2. The wire feeder of claim 1, wherein the lift member is selectively moveable in at least two directions with respect to the support base.

3. The wire feeder of claim 1, wherein the lift member is configured to be selectively rotated about an axis to adjust the lift point.

4. The wire feeder of claim 1, further comprising a latch assembly actuatable to selectively lock the lift member in positions with respect to the support base.

5. The wire feeder of claim 4, wherein the latch assembly further comprises a lever arm, wherein:
the lever arm is pivotable about a lever axis between a latched position and an unlatched position;
the lift member is movable with respect to the support base to enable adjustment of the lift point when the lever arm is in the unlatched position; and
the lift member is locked with respect to the support base when the lever arm is in the latched position.

6. The wire feeder of claim 1, further comprising:
a fastener; and
a plate including a plurality of openings, wherein the fastener is removably insertable into the openings to selectively lock the lift member in a plurality of positions with respect to the base.

7. The wire feeder of claim 1, wherein the wire drive assembly is positioned in front of the wire supply source on the support base, in a longitudinal direction defined between the wire drive assembly and the wire supply source, and the lift member is selectively movable in a direction transverse to the longitudinal direction to enable horizontal adjustment of the lift point of the wire feeder.

8. The wire feeder of claim 1, wherein the lift member is selectively moveable to a plurality of positions with respect to the support base, including a lift position in which the lift member is located above at least one of the wire drive assembly and the wire supply source with respect to the vertical direction, and a tow position in which the lift member is located at a forward end of the support base or a rear end of the support base to enable towing of the wire feeder with the lift member.

9. The wire feeder of claim 8, wherein:
the support base comprises a plate defining a support surface;
the wire drive assembly and the wire supply source are positioned on the support surface; and
the lift member is located at a front portion of the plate forward of the wire drive assembly when the lift member is in the tow position.

10. The wire feeder of claim 1, wherein the lift member comprise a lift eye.

11. A wire feeder having an adjustable lift point, comprising:
a wire supply source configured to supply welding wire;
a wire drive assembly configured to feed wire to a welding gun from the wire supply source;
a support base, the wire supply source and the wire drive assembly supported by the base; and
a lift member connected to the support base and selectively movable in at least one direction with respect to the support base to enable adjustment of the lift point of the wire feeder;
a latch assembly comprising a lever arm and actuatable to selectively lock the lift member in positions with respect to the support base, wherein:
the lever arm is pivotable about a lever axis between a latched position and an unlatched position;
the lift member is movable with respect to the support base to enable adjustment of the lift point when the lever arm is in the unlatched position; and
the lift member is locked with respect to the support base when the lever arm is in the latched position; and
a biasing member to bias the lever arm to the locked position.

12. A wire feeder having an adjustable lift point, comprising:
a hub configured to support a spool of welding wire;
a wire drive assembly including a housing and configured to feed wire to a welding gun from the spool;
a base, the hub and the wire drive assembly supported by the base;
a frame member extending from the base; and
a lift eye connected to the base and selectively movable to a plurality of positions with respect to the base to adjust a lift point with respect to the center of gravity of the wire feeder, wherein the lift eye is connected to the frame member, and the frame member is selectively rotatable about an axis to adjust the position of the lift eye with respect to the base.

13. The wire feeder of claim 12, wherein:
the wire drive assembly is positioned in front of the hub; and
the plurality of positions includes at least two positions, with a first of the two positions closer to the front of the wire drive assembly than a second of the two positions.

14. The wire feeder of claim 12, wherein:
the plurality of positions includes a tow position in which the lift point is located forward of the wire drive assembly to enable the wire feeder to be pulled along a horizontal plane.

15. The wire feeder of claim 12, wherein:
the plurality of positions includes at least two positions including a first position that is further forward than a second position.

16. The wire feeder of claim 12, wherein:
the plurality of positions includes a plurality of positions offset from a center of the wire drive assembly.

17. A wire feeder having an adjustable lift point, comprising:
a hub configured to support a spool of welding wire;
a wire drive assembly including a housing and configured to feed wire to a welding gun from the spool;
a base, the hub and the wire drive assembly supported by the base;
a lift eye connected to the base and selectively movable to a plurality of positions with respect to the base to adjust a lift point and the center of gravity of the wire feeder;
a frame member extending from the base, the lift eye connected to the frame member, the frame member selectively movable to adjust the position of the lift eye with respect to the base; and
a fastener configured to selectively lock the frame member in place.

18. A wire feeder, comprising:
a hub configured to support a spool of welding wire;
a wire drive assembly including a housing and configured to feed wire to a welding gun from the spool;
a base, the hub and the wire drive assembly supported by the base;

a lift eye connected to the base and selectively movable to a plurality of positions with respect to the base to adjust a lift point and the center of gravity of the wire feeder; and a latch assembly comprising a lever arm and actuatable to selectively lock the lift member in positions with respect to the support base, wherein:
the lever arm is pivotable about a lever axis between a latched position and an unlatched position;
the lift eye is movable with respect to the support base to enable adjustment of the lift point when the lever arm is in the unlatched position; and
the lift eye is locked with respect to the support base when the lever arm is in the latched position.

19. A wire feeder having an adjustable lift point, comprising:
a hub configured to support a spool of welding wire;
a wire drive assembly including a housing and configured to feed wire to a welding gun from the spool;
a base, the hub and the wire drive assembly supported by the base;
a lift eye connected to the base and selectively movable to a plurality of positions with respect to the base to adjust a lift point and the center of gravity of the wire feeder;
a fastener; and
a plate including a plurality of openings, wherein the fastener is removably insertable into the openings to selectively lock the lift eye in a plurality of positions with respect to the base.

* * * * *